No. 753,714. PATENTED MAR. 1, 1904.
H. KRANTZ.
CONDUIT FOR ELECTRICAL CONDUCTORS.
APPLICATION FILED SEPT. 9, 1903.
NO MODEL.

WITNESSES:
F. W. Wright
M. H. Miles

INVENTOR
Hubert Krantz
BY Hawson & Hawson
HIS ATTORNEYS

No. 753,714. Patented March 1, 1904.

UNITED STATES PATENT OFFICE.

HUBERT KRANTZ, OF NEW YORK, N. Y.

CONDUIT FOR ELECTRICAL CONDUCTORS.

SPECIFICATION forming part of Letters Patent No. 753,714, dated March 1, 1904.

Application filed September 9, 1903. Serial No. 172,434. (No model.)

*To all whom it may concern:*

Be it known that I, HUBERT KRANTZ, a citizen of the United States of America, and a resident of the borough of Brooklyn, city of New York, county of Kings, and State of New York, have invented an Improved Conduit for Electrical Conductors, of which the following is a specification.

The object of this invention is to so construct a sheet-metal conduit for electrical conductors, particularly for interior wiring, as to facilitate and simplify the installation of the wires in the conduit. To accomplish this object, I form inturned ledges or shelves at the open side of the conduit, so that wires once placed therein will rest more or less on said shelves regardless of whether the cover is in place or not. This permits the electrician to string the wires throughout any section, disregarding the cover until such time as it may suit him to put it in place.

Figure 1:
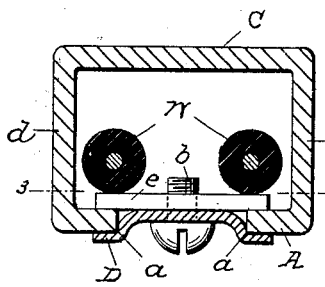
Figure 4:
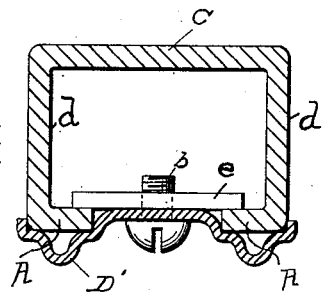
Figure 5:
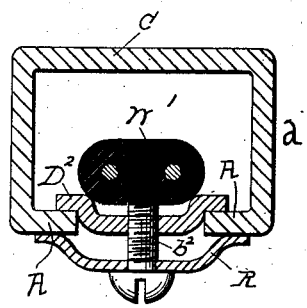
Figure 2:
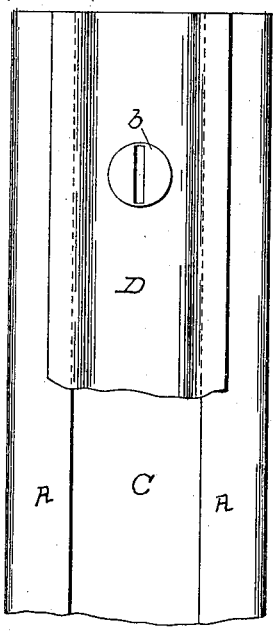
Figure 3:
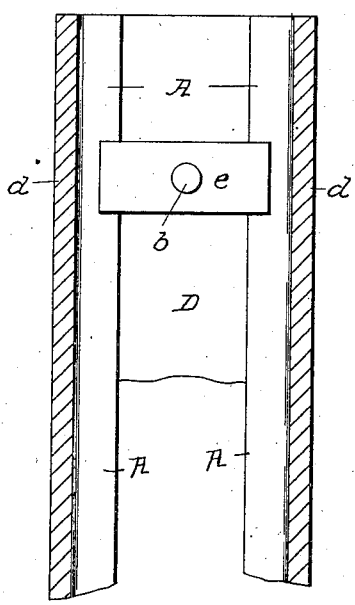
Figure 6:
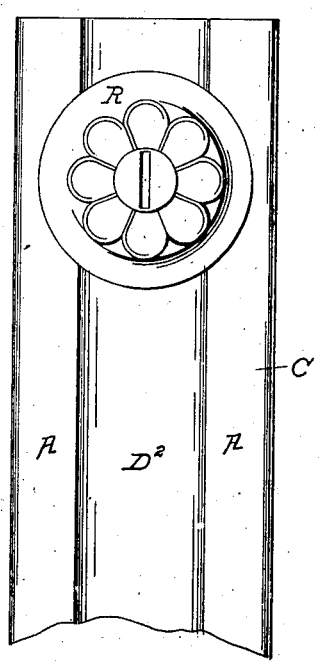
Figure 7:
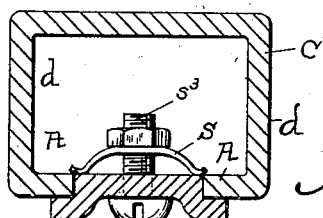

In the accompanying drawings, Figure 1 is a section of a sheet-metal conduit and cover according to my invention. Fig. 2 is a face view of the same, partly broken away. Fig. 3 is a view on line 3 3, Fig. 1. Fig. 4 is a sectional view of a modified cover similar to Fig. 1. Figs. 5 and 6 are respectively a section and a face view of a further modification. Fig. 7 is a transverse section of a modification showing a spring to hold the cover in place.

As shown in Figs. 1, 2, and 3, C is a substantially rigid sheet-metal conduit having side walls $d\,d$, on which I form inwardly-turning shelves A A, preferably running the length of the conduit and leaving a more or less constricted central longitudinal opening between them for the insertion of the wires W W, which may be separate conductors, as shown in Fig. 1, or plural conductors, as shown by the twin-cable W', Fig. 5. These conductors rest more or less on the ledges A A, by which they are held in place, particularly where the conduit is affixed to ceilings.

A cover D, consisting of long strips of sheet metal, is preferably formed to fit nicely between the edges of the shelves, as by having shouldered longitudinal ridges $a\,a$, formed thereon for that purpose. The cover is drilled at intervals to receive screws $b$, which take into cross-bars $e$ within the conduit. The screw when loose permits this bar to be inserted within the conduit and afterward turned at will; but upon the tightening of the screw when the bar is transverse to the cover's length the bar and cover will be caused to grip the shelves between them to hold the cover in place. As shown in Fig. 4, this cover D' may be ornamental in design and may overlap the edge of the conduit to entirely hide it from view.

As shown in Figs. 5 and 6, the cover $D^2$ may be slipped inside and itself rest upon the shelves A A, while ornamental rosettes R are applied to the outside at intervals to permit the cover to be secured in position by a screw $b^2$.

As shown in Fig. 7, the cover may carry on the inside at intervals in the length of the conduit-springs S (bars or disks) to take the place of the bars shown in Fig. 1. Nuts and screws $s^3$ are provided to secure the spring to the cover and to expand the spring over onto the inner faces of the shelves A A.

I claim as my invention—

1. A substantially rigid metal conduit having sides terminating in inwardly-turned shelves, said inwardly-turned shelves forming a constricted opening to the conduit, and adapted to support the wiring, substantially as and for the purpose described.

2. A substantially rigid metal conduit having sides terminating in inwardly-turned shelves, said inwardly-turned shelves forming a constricted opening to the conduit, and adapted to support the wiring, in combination with a cover and means to secure said cover in position in said space, substantially as described.

In testimony whereof I have signed my name to this specification in the presence of two subscribing witnesses.

HUBERT KRANTZ.

Witnesses:
 ALMON B. FULLER,
 W. M. SUTOSH.